United States Patent

Tedesco

Patent Number: 5,856,842
Date of Patent: Jan. 5, 1999

[54] APPARATUS FACILITATING EYE-CONTACT VIDEO COMMUNICATIONS

[75] Inventor: James M. Tedesco, Livonia, Mich.

[73] Assignee: Kaiser Optical Systems Corporation, Ann Arbor, Mich.

[21] Appl. No.: 918,460

[22] Filed: Aug. 26, 1997

Related U.S. Application Data

[60] Provisional application No. 60/024,582 Aug. 26, 1996.

[51] Int. Cl.⁶ ....................................................... H04N 7/14
[52] U.S. Cl. ................................. 348/20; 348/14; 348/15; 348/16; 348/17
[58] Field of Search ................................. 348/14, 15, 16, 348/17, 18, 19, 20; 345/156, 157

[56] References Cited

U.S. PATENT DOCUMENTS

| | | | |
|---|---|---|---|
| 4,711,512 | 12/1987 | Upatnieks | 350/3.7 |
| 4,928,301 | 5/1990 | Smoot | 379/53 |
| 5,117,285 | 5/1992 | Nelson et al. | 358/85 |
| 5,159,445 | 10/1992 | Gitlin et al. | 358/85 |
| 5,243,413 | 9/1993 | Gitlin et al. | 358/55 |
| 5,317,405 | 5/1994 | Kuriki et al. | 348/20 |
| 5,341,230 | 8/1994 | Smith | 359/13 |
| 5,359,362 | 10/1994 | Lewis et al. | 348/15 |
| 5,400,069 | 3/1995 | Braun et al. | 348/20 |
| 5,438,357 | 8/1995 | McNelley | 348/15 |
| 5,500,671 | 3/1996 | Andersson et al. | 348/15 |
| 5,515,184 | 5/1996 | Caulfield et al. | 359/34 |
| 5,532,736 | 7/1996 | Kiriki et al. | 348/20 |
| 5,572,248 | 11/1996 | Allen et al. | 348/15 |
| 5,612,733 | 3/1997 | Flohr | 348/14 |
| 5,612,734 | 3/1997 | Nelson et al | 348/20 |
| 5,619,254 | 4/1997 | McNelley | 348/20 |

OTHER PUBLICATIONS

S. Reinhorn, Y. Amitai, A. Friesem, "Visor display with planar holographic optical elements," *SPIE's Working Group Newsletter*, Jul. 1995, p. 2.

*Primary Examiner*—Curtis A. Kuntz
*Assistant Examiner*—Melur Ramakrishnaiah
*Attorney, Agent, or Firm*—Gifford,Krass,Groh,Sprinkle,Patmore,Anderson&Citkowski

[57] ABSTRACT

Apparatus for gathering a frontal facial image of an individual observing a display area includes a light-conductive waveguide, transferring the image from a first light-redirecting region to a second light-redirecting region to output the image. The element is supported at least partially in front of the display, such that the input region overlies the display area, and all portions of the element overlying the display area, including the input region, are sufficiently transparent so as not to substantially interfere with the individual's observation of the display. In a preferred embodiment, at least the input region is a holographically derived optical grating, and the element is a transparent panel constructed of glass and/or plastic. In use in a communications system, the invention would preferably further include an optoelectronic image sensor disposed to receive the image from the output region, enabling the image to be transferred, for example, to a display at a remote location, which may also incorporate the invention to facilitate two-way eye-contact communications.

8 Claims, 1 Drawing Sheet

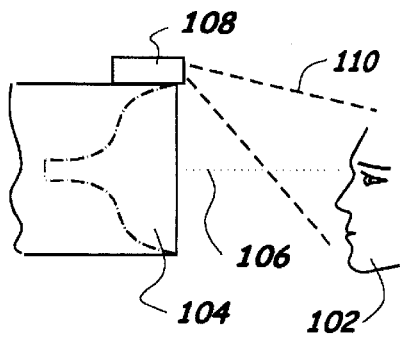
Figure - 1
(Prior Art)
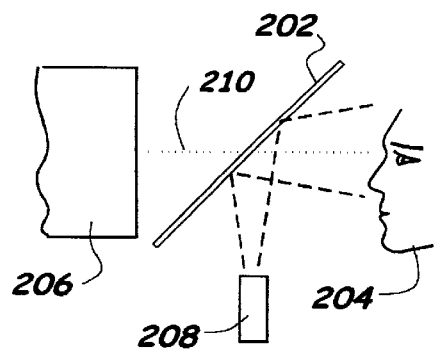
Figure - 2 (Prior Art)
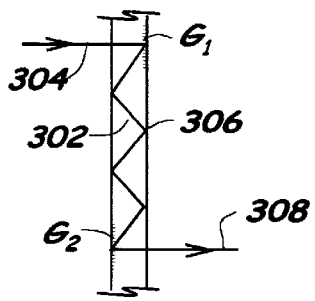
Figure - 3
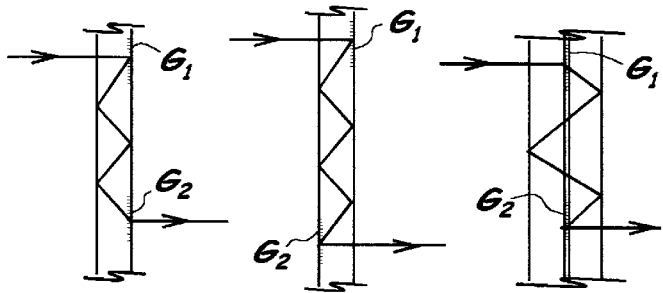
Fig. 4A   Fig. 4B   Fig. 4C
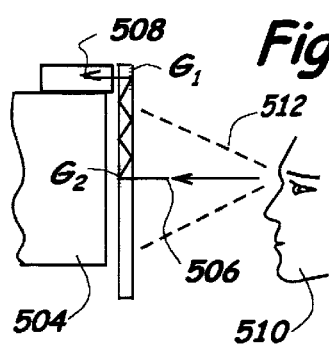
Figure - 5
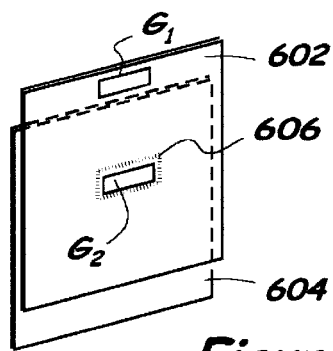
Figure - 6

APPARATUS FACILITATING EYE-CONTACT VIDEO COMMUNICATIONS

REFERENCE TO RELATED APPLICATION

This application claims priority of U.S. provisional application Ser. No. 60/024,582, filed Aug. 26, 1996, the entire contents of which are incorporated herein by reference.

FIELD OF THE INVENTION

This invention relates generally to communications systems of the type wherein an operator observes a display while being imaged by a video camera and, more particularly, to such a system which facilitates an eye-contact view of the operator. Fields of use include video conferencing and teleconferencing, video telephone and other applications.

BACKGROUND OF THE INVENTION

In video communication systems of the type wherein an operator observes a display while being imaging by a video camera, a problem persists because the display and the camera cannot be in the same optical path. FIG. 1 illustrates the problem. An operator 102 wishes to view a display 104, creating an optical path required for an eye-contact view of the observer along line 106. At the same time, a camera 108 may be used to gather an image of the operator 102, utilizing a field of view 110. However, since the camera 108 cannot be located along path 106 without interfering with the display, the image taken of the operator 102 is typically that of an individual not looking at the camera, i.e., with his or her eyes looking slightly downwardly (or upwardly, depending upon the placement of the camera). Although a cathode-ray tube (CRT) type of display is depicted in broken-line form in FIG. 1, this problem is not limited to the use of the CRT display, but manifests itself with any type of display, including flat-panel types such as liquid-crystal displays, since the problem arises from the inability to realize a display/camera co-residency, regardless of technology.

As shown in FIG. 2, there exists one known attempt to solve this problem. In this case, a beamsplitter 202 is supported in the optical path between an operator 204 and a display apparatus 206. With this configuration, a camera 208 may be placed substantially off axis from the line of eye contact 210, including perpendicular to the line 210, as shown. With the beamsplitter 202 being positioned to substantially transmit the scene on display 206 to the operator 204 while reflecting the image of the operator 204 into the camera 208, a situation results wherein the camera 208 may effectively, at least optically, image along the line of eye-contact 210, resulting in a transmitted image of the operator 204 which is frontal, thereby facilitating eye contact.

However, serious problems exist with the use of the beamsplitter arrangement shown in FIG. 2, including the fact that beamsplitters are inefficient and bulky. The efficiency may result in the operator 204 observing a vestigial image of the camera 208, and the bulkiness precludes this arrangement from being used in compact configurations, which are becoming increasingly popular for video teleconferencing, video telephones, and so forth. The need remains, therefore, for apparatus and methods which will enable an operator viewing a display to be frontally viewed in a compact and efficient manner, thereby facilitating eye-contact in a variety of communications and conferencing-type systems.

SUMMARY OF THE INVENTION

This invention provides apparatus for gathering a frontal facial image of an individual observing a display area. In one embodiment, such apparatus includes a light-conductive element having a first light-redirecting region to input the image and a second light-redirecting region to output the image. The element functions as a waveguide, transferring the image from the first area to the second area by way of total internal reflection. The element is supported at least partially in front of the display, such that the input region overlies the display area, and all portions of the element overlying the display area, including the input region, are sufficiently transparent so as not to substantially interfere with the individual's observation of the display. In a preferred embodiment, at least the input region is a holographically derived optical grating, and the element is a transparent panel constructed of glass and/or plastic.

In use in a communications system, the invention would preferably further include an optoelectronic image sensor disposed to receive the image from the output region, enabling the image to be transferred, for example, to a display at a remote location. The remote location may also be equipped with a second display, second image sensor and second substantially transparent waveguide, enabling individuals viewing each display to receive an eye-contact image of the individual at the remote location. Additional conferrees may also be suitably equipped for group communications.

BRIEF DESCRIPTION OF THE DRAWINGS

FIG. 1 is a skeletal, side-view illustration of a display/camera co-residency problem solved by this invention;

FIG. 2 illustrates a prior-art solution to the problem introduced with respect to FIG. 1 involving the use of a beamsplitter;

FIG. 3 is a cross-sectional drawing of an optical grating according to the invention which may be used to solve the display/camera co-residency problem;

FIGS. 4A to 4C represent cross-sectional views of alternative optical gratings according to the invention;

FIG. 5 is a skeletal, side-view drawing of an optical element according to the invention in use a video conferencing system; and FIG. 6 is an embodiment of the invention as seen from an oblique perspective.

DETAILED DESCRIPTION OF THE PREFERRED EMBODIMENT

This invention solves the problem of realizing eye contact in a system of the type wherein an operator is imaged while viewing a display. The invention is applicable to numerous operational environments, including on-line video teleconferencing, in which case both or all participants would benefit from the apparatus and methods disclosed herein. Being highly compact, the invention lends itself to video telephones and portable electronic devices as well, including laptop computers having flat-panel displays. Broadly, according to the invention, the perspective of an operator viewing a display is substantially frontal, enabling a recipient of the operator image to receive an eye-contact view of the operator. In a two-way system, the operator would typically be viewing an image of the image recipient, but such is not required according to the invention, as the operator may be viewing anything on the associated display with the recipient of the operator's image still receiving an eye-contact view. Nor is it necessary that these various transmissions occur in real time, as the view taken of the operator may be recorded for later use.

The approach taken by the invention is to form a plurality of gratings on a waveguide enabling it to function as a "periscope" that deviates a line of sight laterally in a thin package, as best seen in FIGS. 5 and 6. First making reference to FIGS. 3 and 4, however, FIG. 3 illustrates, in cross-section, an embodiment of this holographic periscope concept. According to the invention, gratings $G_1$ and $G_2$ are disposed on an otherwise clear window 302. The gratings may be formed with any grating technology, including volume and surface-relief holographic techniques or computer-generated or mechanical ruling techniques. For example, in a preferred embodiment, the gratings may be formed using the recording material dichromated gelatin applied to a glass or plastic substrate. Grating $G_1$ takes incident light and diffracts it to an angle that becomes internally guided in the window in conjunction with points 306 of internal reflection. An identical grating $G_2$, laterally displaced on the window 302, diffracts the guided light back out of the window along a path 308 which is preferably parallel to the path of original entry.

Note that the spectral dispersions of the two gratings compensate for each other in this geometry, resulting in a chromatically-corrected periscope. As shown in FIGS. 4A–C, the gratings may be either transmissive or reflective (or one of each) and that they may, if necessary, be buried in a "sandwich" structure (FIG. 4C). The only requirement is that the entrance and exit paths be parallel and preferably, perpendicular to the plane of the light-carrying window.

As shown in FIG. 5, a device of the type described above is then used to realize eye-contact imaging of operator 510 having field of view 512, even as a retro-fit over existing computer displays, including projection-type arrangements. The general geometry shown in FIG. 5, includes a camera/window assembly 502, which may be placed over any display 504 to shift the line of sight 506 of a camera 508 to pass through a centralized area of the display in the vicinity of grating $G_2$. As shown in FIG. 6, although a window in the form of a strip may be used according to the invention, preferably a panel 602 is used which entirely covers the surface of the display 604, with gratings $G_1$ and $G_2$ being positioned as appropriate, in relation to the operator and camera. The panel may alternatively be incorporated into the design of the display, for example, as a CRT or LCD cover glass.

A color camera system would use visible wavelength light, with $G_1$ at high efficiency and $G_2$ at low efficiency to avoid visible interference with the display (a low light level camera can compensate for low efficiency of $G_2$) The gratings may optionally be a superposition in terms of their spectral responses, for example by having up to three different gratings with responses in the red, green and blue spectral regions to provide a greater color range. To further avoid visual interference, the area surrounding grating $G_2$ may be optically "feathered" to avoid a sharp visual transition between the area of the grating and the surrounding transparent window. For example, a holographic grating may be used having a perimeter is formed with a tapered exposure that over a short distance gradually tapers to zero rather than exhibiting a sharp boundary. The surface behind $G_1$ should also be made opaque to avoid cross talks with the undeviated line of sight (ghost images). Alternatively, a near-infrared camera may be used, perhaps even with an active LED source of illumination, if necessary, to form a monochrome image. As such, the NIR gratings $G_1$ and $G_2$ may both be made relatively efficient without any visible degradation of the displayed image path, for example through the use of volume holograms which are known to have a limited spectral bandwidth.

There will be tradeoffs in the design specifics between aperture of the camera grating $G_1$ the aperture of grating $G_2$, thickness of the window, operating wavelength range, field of view, etc. Improper design can result in multiple overlapping images being presented to the camera. However, solutions to these design issues will be a straightforward matter to one reasonably skilled in the field of optical design.

That claimed is:

1. Apparatus for gathering a frontal facial image of an individual observing a display area, comprising:

a light-conductive element having a first light-redirecting region to input the image and a second light-redirecting region to output the image, the element being operative to transfer the image from the first area to the second area by way of total internal reflection, the element being supported partially in front of the display such that the input region overlies the display area, and wherein all portions of the element overlying the display area, including the input region, are sufficiently transparent so as not to substantially interfere with the individual's observation of the display.

2. The apparatus of claim 1, wherein at least the input region is a holographically derived optical grating.

3. The apparatus of claim 1, further including an optoelectronic image sensor disposed to receive the image from the output region.

4. The apparatus of claim 1, wherein the light-conductive element is a transparent panel having opposing surfaces, and wherein at least the first region is an optical grating associated with a portion of one of the surfaces.

5. The apparatus of claim 1, wherein the first light-redirecting region has a perimeter which is optically feathered to provide a smooth visual transition between the first region and the surrounding panel.

6. Apparatus for gathering a frontal facial image of an individual observing a display area, comprising:

a light-conductive panel having a first section overlying the display area and a second section outside of the display area, the first and second sections incorporating first and second optical gratings, respectively, the first grating being operative to receive the image and diffract the image at an angle allowing the panel to convey the image to the second grating through total internal reflection, the second grating being operative to recover the reflected image and diffract the image out of the panel, the first section of the panel being sufficiently transparent so as not to substantially interfere with the individual's observation of the display.

7. An eye-contact video communications system, comprising:

a display defining an optical path to a viewer;

an image sensor outside of the optical path; and a substantially transparent waveguide having a first optical grating disposed within the optical path to receive a facially frontal image of the viewer and a second optical grating outside of the optical path coupling the image to the image sensor.

8. The eye-contact video communications system of claim 7, further including a second display, second image sensor and second substantially transparent waveguide disposed at a remote location, each image sensor being coupled to a remote display, enabling individuals viewing each display to receive an eye-contact image of the individual at the remote location.

* * * * *